2 Sheets--Sheet 1
J. BLACKADDER.
Improvement in Fare-Boxes.
No. 4,996.
Reissued July 23, 1872.
—FIG. I—
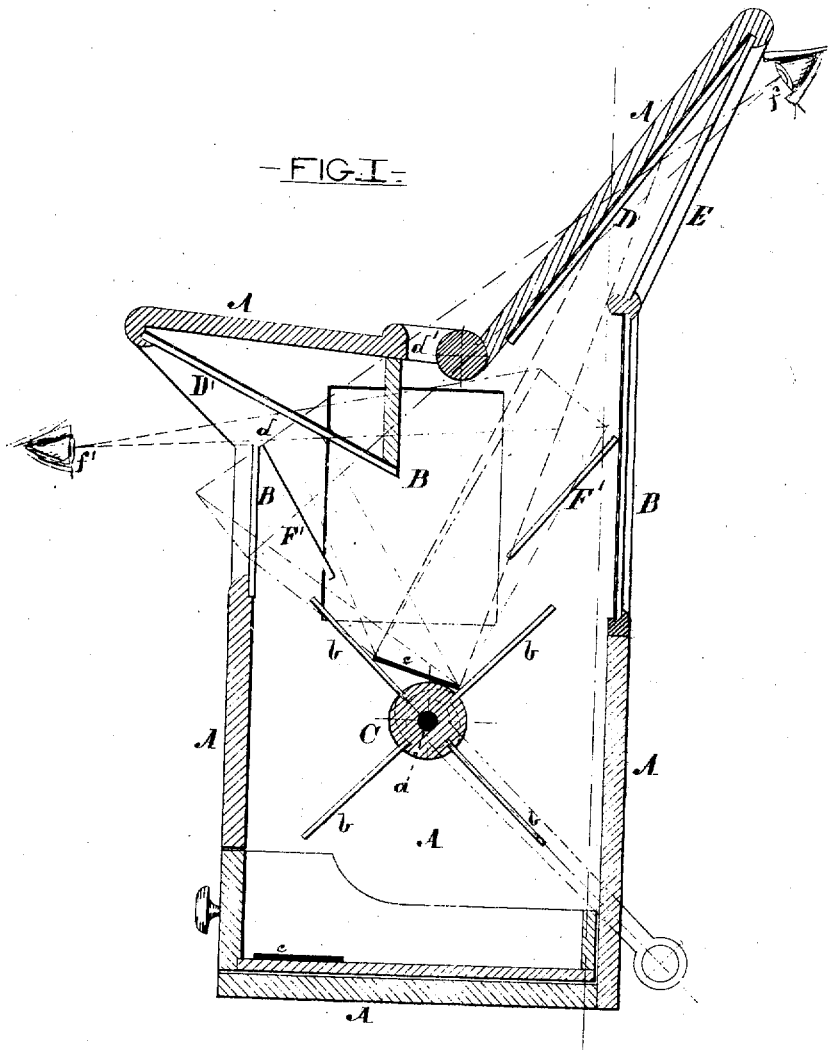
—WITNESSES:—
L. C. Stuart
G. Hannay
—INVENTOR:—
J. B. Clawson
Agent for J. Blackadder
by his Atty. P. Hannay 2 Sheets--Sheet 2.
J. BLACKADDER.
Improvement in Fare-Boxes.
No. 4,996. Reissued July 23, 1872.
— FIG. II —
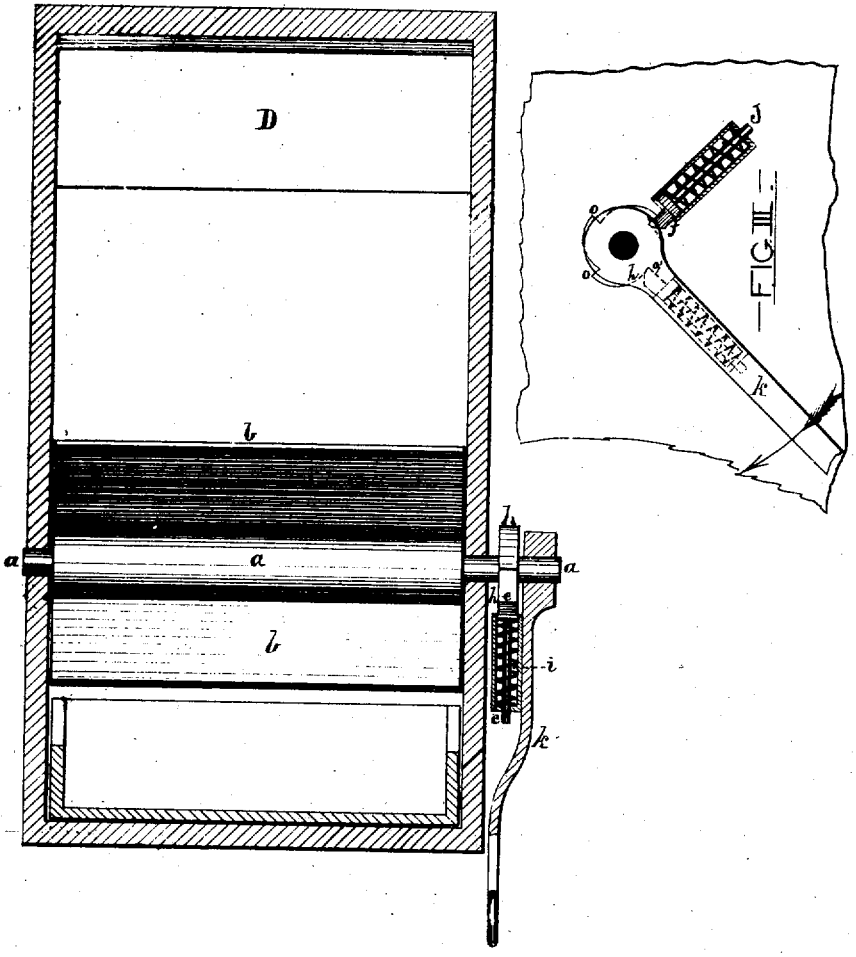
— FIG. III —
WITNESSES:—
D. G. Stuart
G. Hannay.
—INVENTOR:—
J. B. Slawson
Assignee of J. Blackadder
by his Atty. S. C. Hannay

UNITED STATES PATENT OFFICE.

JOHN BLACKADDER, OF NEW ORLEANS, LA., ASSIGNOR TO J. B. SLAWSON.

IMPROVEMENT IN FARE-BOXES.

Specification forming part of Letters Patent No. 69,166, dated September 24, 1867; reissue No. 4,996, dated July 23, 1872.

*To all whom it may concern:*

Be it known that JOHN BLACKADDER, of New Orleans, in the parish of Orleans, in the State of Louisiana, has invented a new and useful Improvement in Passenger Fare-Boxes for use in street-cars, omnibuses, &c., of which the following is a full, clear, and exact description, reference being had to the accompanying drawing making part of this specification, in which—

Figure 1 represents a vertical transverse section of a box from front to rear having his improvement applied thereto; and Fig. 2, a similar view, but from side to side, taken through the line *x x* of Fig. 1; and Fig. 3, a front view of the operating mechanism, with that side of the box partially broken off.

The invention consists in combining a reflector with a fare-box in such manner that an image of the fare, when deposited in the box and temporarily arrested for the purpose, can be seen and inspected by the driver without the necessity of looking directly down upon the arrest-apron or wheel for that purpose. It also consists in combining a reflector with a fare-box in such manner that an image of the fare, when deposited in the box and temporarily arrested for the purpose, can be seen and inspected by the passengers without the necessity of looking directly down upon the arrest-apron or wheel for that purpose. It further consists in combining therewith one or two glass-covered openings for the admission of light to the box, and one or two glass slides for guiding the fare down to the arrest apron or wheel, while suffering the rays of light to pass from the fare to the reflectors, and an apron or fan-bladed wheel for temporarily arresting the fare for inspection either by the driver or passengers, or both.

In the drawing, A represents the outside casing of the box, which may be made of wood or any other suitable material. B B B represent ground or stained glass set into the casing, they being sufficiently transparent to admit necessary light to the interior of the box, so as to illuminate the fare when deposited and temporarily arrested by the wings of the wheel C. The wheel C is composed of a shaft, *a*, having a series of flat wings or fan-blades, *b*, suitably secured thereto, and arranged at regular intervals apart and so as to extend from side to side of the box. The radial length of the blades is such that when the blades are brought into a horizontal plane they will not impinge upon the front or rear side of the casing of the box. Thus constructed, the wheel is mounted in suitable bearings formed in the sides of the box, and so as to rotate in or nearly in a vertical plane. Upon one end of the shaft *a*, outside of the casing, is secured a ratchet-wheel, *h*. This wheel is provided with a ratchet tooth or notch, *o*, for each and every blade *b* on the wheel C. At the side of this ratchet-wheel, and on the same shaft *a*, is mounted a lever, *k*, in such manner as to turn freely on the shaft. The lever *k* carries a pawl, *e*, whose toothed end, through the action of a spring, *i*, suitably arranged for the purpose, is made to engage successively with the teeth *o* of the ratchet-wheel each time the lever is raised and lowered. Thus arranged, the lever, each time it is raised and lowered, will (the pawl *e* acting on one of the teeth of the ratchet-wheel) cause the wheel C to perform a partial revolution. The extent of this partial revolution is in direct proportion to the number of teeth *o* on the ratchet-wheel—that is to say, if the wheel C is provided with four blades, and consequently the ratchet-wheel *h* with four teeth, *o*, as represented in the drawing, then the lever *k*, each time it is raised and lowered, will cause the wheel C, through the action of the pawl *e* in the ratchet-wheel *h*, to perform a one-fourth part of a revolution; for which purpose the throw of the lever is so adjusted as to just turn the ratchet-wheel the corresponding distance. The wheel C, when thus turned, is in proper position to receive the fare, and is held in that position by an independent spring catch or pawl J, suitably arranged for that purpose on the outside of the box, whose end is made to engage with the teeth *o* of the ratchet-wheel, thereby preventing any backward movement of the wheel C while the lever K and pawl *e* are being moved to engage with another tooth. The end of the lever K is made to project within convenient reach of the driver, so that after inspecting the fare he can, by operating it, drop the fare directly into the drawer *m* beneath. D D′ represent reflectors, which may be made either of glass or metal. E represents a glass-covered opening immediately opposite reflector D. The two pieces F and F′ are also made of glass, and act as guides to conduct the fare to the wheel. In the drawing, two openings, *d* and *d′*, are shown, through which the passengers can deposit their fare in the box. The upper one, *d′*, represents the mouth through which the outside passengers deposit their fare, and the other, *d*, for the inside passengers. The fare, on being deposited into the box through either mouth, is arrested by the wheel, so that the driver, on looking through the glass E, as at *f*, into the mirror D, will, by the reflection of the rays of light from the fare *c*, see the latter as though it were at the point *g*, while the passengers, looking into the mirror D′, as at *j*, will, for the same reason, see it as though it were at the point *g′*. Thus the driver as well as the passengers can scrutinize the fare as soon as deposited to see that it is genuine and correct in amount.

What is claimed as new is—

1. A reflector, D, arranged substantially as described with relation to the arrest apron or wheel of a fare-box, and above the same, that the driver or conductor may readily scrutinize an image of the fare as deposited without the necessity of looking directly at the arrest-apron, all constructed and arranged substantially as shown and set forth.

2. A reflector, D′, arranged substantially as described with relation to the arrest-apron or wheel of a fare-box, and above the same that the passengers may readily scrutinize an image of the fare deposited by them without the necessity of looking directly at the arrest-apron, all constructed and arranged substantially as shown and set forth.

3. In combination with the reflector D, arranged substantially as set forth with relation to the arrest-apron or wheel of a fare-box, I claim a glass slide, F′, and a glass-covered opening or openings, B, for the purposes set forth.

4. In combination with the reflector D′, arranged substantially as set forth with relation to the arrest-apron or wheel of a fare-box, I claim a glass slide, F, and a glass-covered opening or openings, B, for the purpose set forth.

In witness whereof I have hereunto set my hand to this specification.

J. B. SLAWSON.

Witnesses:
P. HANNAY,
A. McCALLUM.